United States Patent [19]

Nakatani et al.

[11] Patent Number: 5,560,020
[45] Date of Patent: Sep. 24, 1996

[54] POWER SAVING PROCESSING SYSTEM

[75] Inventors: Kohichi Nakatani, Yokohama; Akio Hayashi, Funabashi; Tomohisa Kohiyama, Yokohama, all of Japan

[73] Assignee: Hitachi, Ltd., Tokyo, Japan

[21] Appl. No.: 763,152

[22] Filed: Sep. 20, 1991

[30] Foreign Application Priority Data

Sep. 21, 1990 [JP] Japan ................................. 2-250183

[51] Int. Cl.⁶ .............................. G06F 1/32; G06F 11/02; G06F 1/04
[52] U.S. Cl. .................... 395/750; 395/375; 395/550; 364/707; 364/DIG. 1; 364/DIG. 2; 365/227
[58] Field of Search .................... 395/750, 375, 395/550; 364/200, 900, 707, DIG. 1, DIG 2; 365/227

[56] References Cited

U.S. PATENT DOCUMENTS

| | | | |
|---|---|---|---|
| 3,941,989 | 3/1979 | McLaughlin et al. | 395/750 |
| 4,316,247 | 2/1982 | Iwamoto | 364/200 |
| 4,317,180 | 2/1982 | Lies | 395/750 |
| 4,317,181 | 2/1982 | Teza et al. | 395/750 |
| 4,379,265 | 4/1983 | Catiller | 395/750 |
| 4,388,690 | 6/1983 | Lumsden | 395/550 |
| 4,409,665 | 10/1983 | Tubbs | 364/900 |
| 4,615,005 | 7/1984 | Maejima et al. | 364/707 |
| 4,718,007 | 1/1988 | Yukino | 395/750 |
| 4,727,491 | 2/1988 | Culley | 364/200 |
| 4,766,567 | 8/1988 | Kato | 395/750 |
| 4,835,681 | 5/1989 | Culley | 364/200 |
| 4,851,987 | 7/1989 | Day | 395/550 |
| 5,025,387 | 6/1991 | Frane | 395/750 |
| 5,083,266 | 1/1992 | Watanabe | 364/DIG. 2 |
| 5,086,387 | 2/1992 | Arroyo et al. | 364/DIG. 1 |
| 5,167,024 | 11/1992 | Smith et al. | 395/375 |
| 5,201,059 | 4/1993 | Nguyen | 395/750 |

OTHER PUBLICATIONS

"The Macintosh Portable" Macworld, Nov. 1989.

*Primary Examiner*—George B. Davis
*Attorney, Agent, or Firm*—Antonelli, Terry, Stout & Kraus

[57] ABSTRACT

A data processing system which has a processor which issues a key sensing signal when waiting for the input of data; a discriminator connected to the processor for judging whether a key sensing signal is received from the processor and for generating a first signal; a controller for generating a second signal in response to the first signal received from the discriminator; and a switch for selecting one of a plurality of clock signals of different frequency to be sent to the processor in response to the second signal received from the controller. Generation of the second signal can be delayed by a first predetermined time, and a second predetermined time during which the key sensing signal is not received can be measured, whereby it is unnecessary to modify an application program to control the supply of power to the processor and only modification of a key sensing routine (BIOS) enables realization of positive power saving.

3 Claims, 4 Drawing Sheets

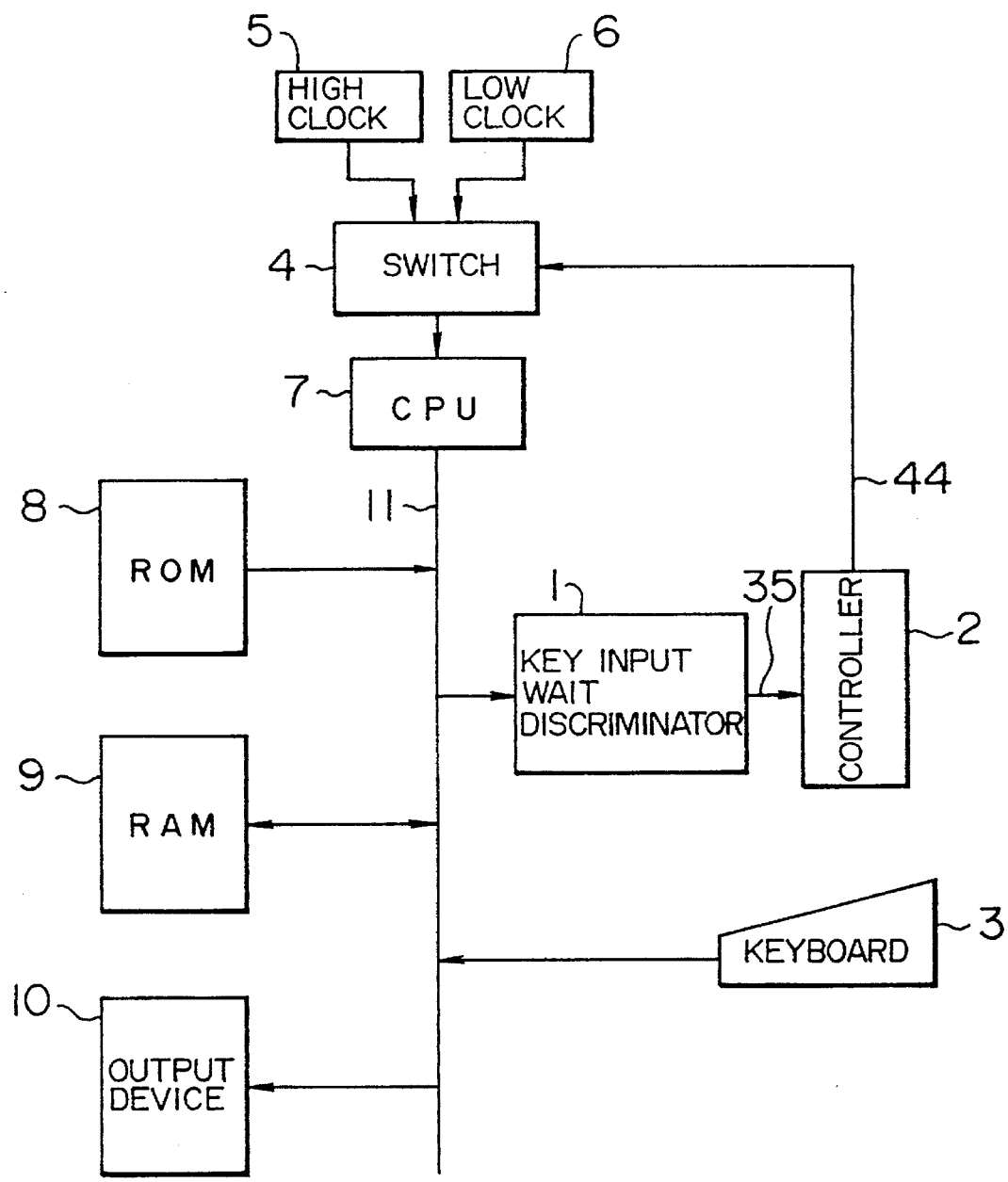

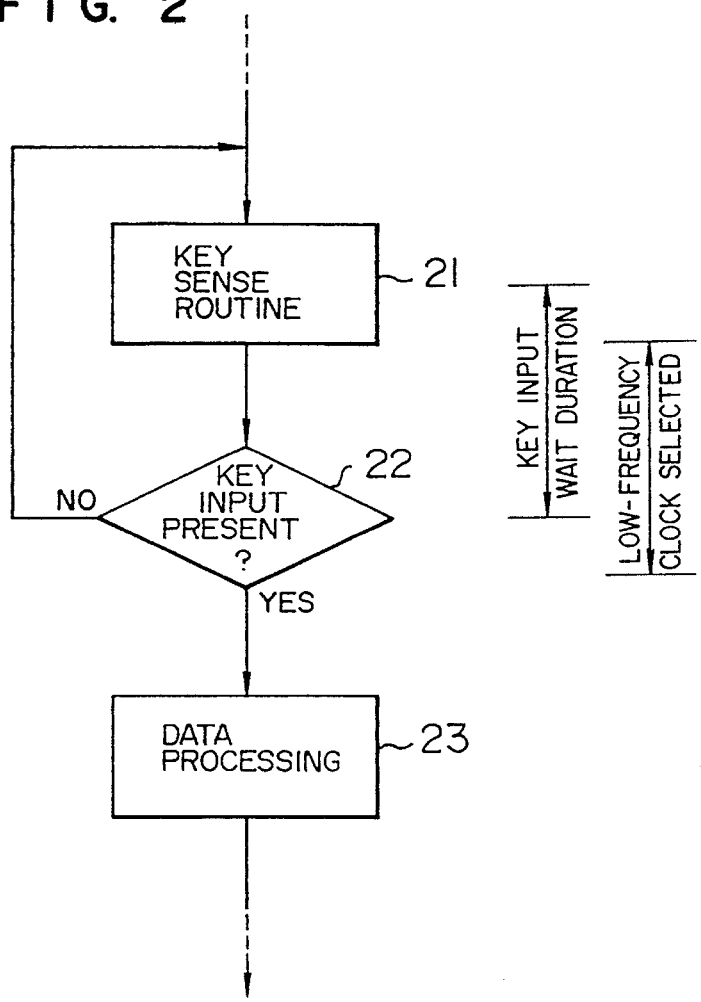
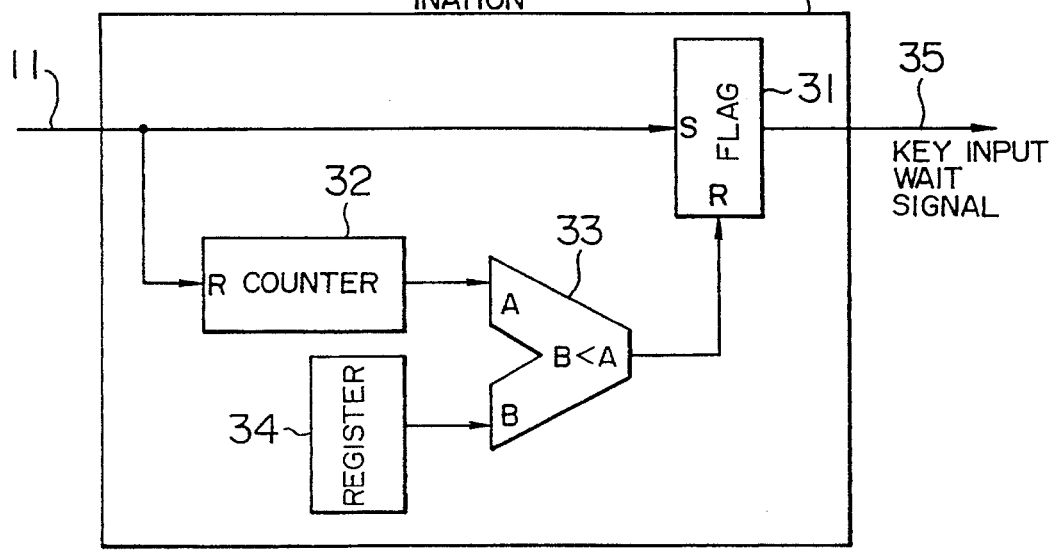

F I G. 4A
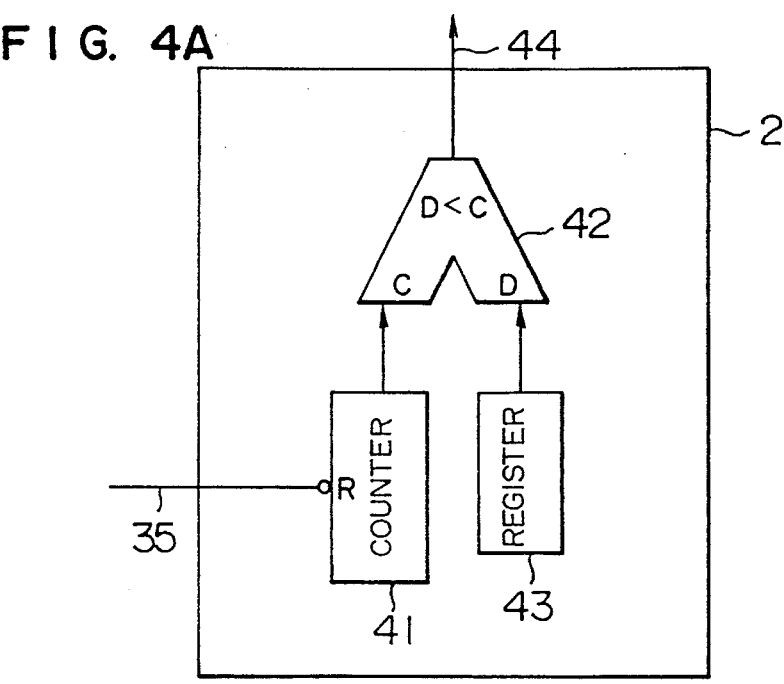
F I G. 4B
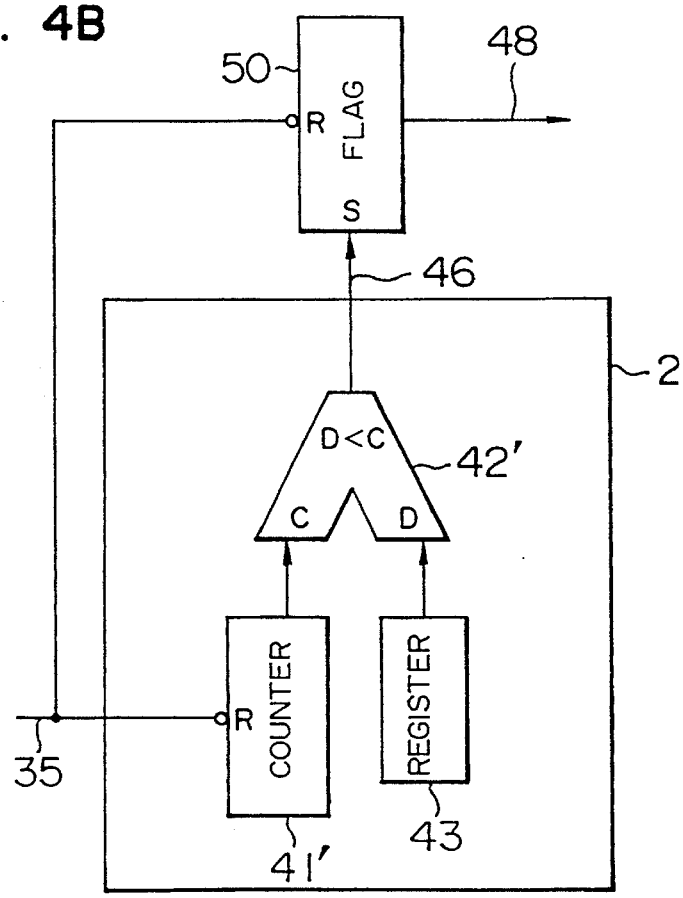

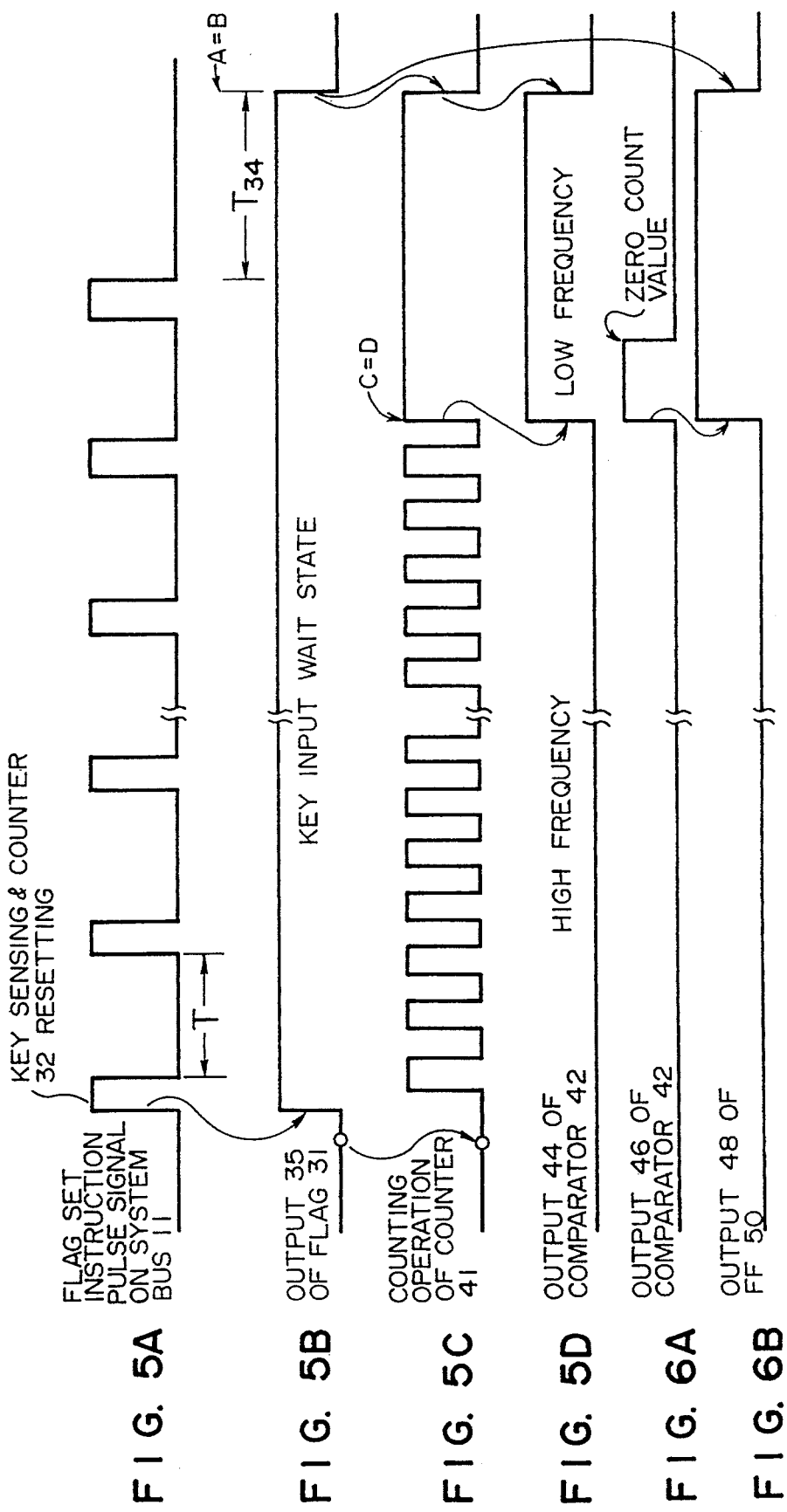

POWER SAVING PROCESSING SYSTEM

BACKGROUND OF THE INVENTION

The present invention generally relates to a power saving processing method and system in data processors and, more particularly, to a power saving processing method and system which detects a key input ready condition or mode independently of an application program and suitably lowers the frequency of the CPU clock in the key input ready mode.

Data processing systems for lowering the frequency of a clock signal to thereby realize a reduction of power consumption are disclosed in a paper titled "THE MACINTOSH PORTABLE" Macworld, November 1989, as well as in U.S. Pat. Nos. 4,727,491 (Culley) and 4,835,681 (Culley), and JP-A-Nos. 63-292312 and 61-43344.

Among data processing systems, most small-sized data processing systems such as personal computers are designed to be operated with battery power from the viewpoint of its portability. Such a small data processing system is required to minimize the power consumption of constituent elements of the processor for realizing power saving and for achieving a long operating time based on the battery.

As a useful one of such conventional power saving techniques, it is known to lower the frequency of a CPU clock. This power saving system is based on reducing the frequency of the CPU clock while an application program is not executing data processing. More in detail, a clock down instruction is previously written in the application program. A CPU, when detecting the clock down instruction during the execution of the application program, lowers the frequency of the CPU clock. Under this condition, no data processing is carried out. When receiving a key input from a keyboard, the CPU increases the clock frequency again to the original level to restart the data processing.

The aforementioned prior art technique requires the analysis of the application program and the writing operation of the clock down instruction in the part of the program which is regarded as a non-data-processing part through the analysis. In other words, such modifying operation is necessary for all the application programs to be used. In addition, when the application program is not subjected to such modification as mentioned above, even the execution of the program will cause no clock down condition.

SUMMARY OF THE INVENTION

It is therefore an object of the present invention to detect when an application program is not in its data processing mode and lower the frequency of a CPU clock, even when the application program is not subjected to any modification.

Another object of the present invention is to provide a power saving processing system which can minimize the power consumption of the processing system while eliminating the need for modifying an application program, and a method therefor.

A further object of the present invention is to provide a power saving processing system which modifies a key input sensing routine called by an application program, in place of modifying the application program in the prior art, for the purpose of changing the frequency of a CPU clock, and a method therefor.

Generally, when an application program is not in its data processing mode, the program is put in its key input wait mode from a keyboard. A key input causes the program to restart the data processing. For the purpose of detecting whether or not the application program has received a key input from the keyboard, in general, a key sense routine among basic input/output system (BIOS) routines is used. In order to detect the key input, the application program calls this key sense routine. Such a BIOS routine as the key sense routine is incorporated in a data processor as a standard routine and is commonly used by various sorts of application programs to be run. That is, the key sense routine will not depend on the application program.

The key input wait state of the application program also refers to the condition that the application program continuously calls the key sense routine. When a key input is carried out, the key sense routine detects the key input and informs the application program of the effect. The application program, when informed from the key sense routine, restarts the data processing.

In order to attain the above object, in accordance with the present invention, there is provided key input wait discrimination means which discriminates whether or not the application program continuously calls the key sense routine.

Further, in the present invention, there is provided control means which lowers the frequency of the CPU clock when the key input wait state continues for a predetermined period of time. When a key input is carried out and the data processing is started, this causes the control means to raise the clock frequency again to the original level.

In accordance with the present invention, the key input wait discrimination means monitors whether to again call the key sense routine in a predetermined time period after the application program calls the key sense routine. When the calling of the key sense routine is effected in the predetermined time, this means that the application program continuously calls the key sense routine. At this time, the key input wait discrimination means judges that the application program is in the key input wait state. When the calling of the key sense routine is not effected in the predetermined time, on the other hand, the key input wait discrimination means judges that the application program is not in the key input wait state, i.e., is in the data processing state.

In accordance with the present invention, furthermore, the control means measures the time during which the application program is in the key input wait state on the basis of the judgement result of the key input wait discrimination means. When the measured time reaches a value of predetermined time, this causes the control means to reduce the frequency of the CPU clock. Under this condition, a key input causes the control means to increase the clock frequency back to the original level.

As has been explained above, in the present invention, the key sense routine independent of the application program is used to judge the key input wait state, i.e., the data processing state. Accordingly, it is possible to positively lower the frequency of the CPU clock while eliminating any need for modifying the application program.

BRIEF DESCRIPTION OF THE DRAWINGS

FIG. 1 is a block diagram of an embodiment of the present invention;

FIG. 2 is a flowchart of an application program;

FIG. 3 is a block diagram of a key input wait discrimination means in FIG. 1;

FIGS. 4A and 4B are block diagrams of different embodiments of a control means in FIG. 1 respectively;

FIGS. 5A, 5B, 5C and 5D show a timing chart for explaining the operation of the control means of FIG. 4A;

FIGS. 6A and 6B show a timing chart for explaining the operation of the control means of FIG. 4B.

DESCRIPTION OF THE PREFERRED EMBODIMENTS

An embodiment of the present invention will be detailed with reference to the accompanying drawings.

Referring first to FIG. 1, there is shown an entire arrangement of a power saving processing system in accordance with the present invention. In the drawing, a ROM 8 for storing therein such a BIOS routine as a key sense routine, a RAM 9 for storing therein an application program, and a keyboard 3 for entering data therethrough and an output device 10 for outputting a data are connected to a CPU through a system bus 11. A key input wait discriminator means 1 is also connected to the CPU 7 through the system bus 11 to discriminate whether or not an application program being run is in its key input wait state, which will be explained later. When a key input waiting time continues for a predetermined time, a controller 2 causes a switch 4 to perform a change-over of the frequency of a CPU clock. The switch 4 supplies either high or low frequency clock signals 5 and 6 as an operating clock signal in a known manner. The high frequency clock signal 5 is set to be, e.g., 8 times or 16 times higher in frequency than the low frequency clock signal 6. The high frequency clock signal 5 is supplied in the data processing mode. On the other hand, the low frequency clock signal 6 is supplied in the key input wait mode.

Shown in FIG. 2 is a flowchart of the application program to be executed by the CPU 7. When waiting for a key input from a keyboard 3, the application program calls a key sense routine 21 from the ROM. The key sense routine 21 checks a key buffer in the RAM 9 and returns the key input data held therein to the application program. In a decision step 22, when the key buffer is empty, that is, when the application program receives no key input data from the key sense routine 21, the application program again calls the key sense routine 21. After this, the operations of the steps 21 and 22 are repeated until an operator of the power saving processing system enters a key input. This condition is referred to as the key input wait state or mode. Entrance of a key input causes the application program to exit the key input wait mode and to execute data processing in a step 23. In the illustrated embodiment, a flag is provided in the key input wait discriminator 1 to rewrite a flag set instruction in the key sense routine 21. As a result, each time the application program calls the key sense routine 21, the flag is set so that the key input wait discriminator 1 can know, on the basis of the set flag, that the key sense routine 21 was called. In this way, this power saving control can be reliably realized as illustrated by a diagram showing a relative relation between a key input wait duration and a low frequency clock duration on the right side of the flowchart in FIG. 2.

FIG. 3 shows an arrangement of an embodiment of the key input wait discriminator 1 in FIG. 1. In the drawing, a flag 31 is set when the key sense routine is called in response to a pulse, shown in FIG. 5A, which is received through the system bus 11. At the same time, the input terminal R of the flag 31 also receives the pulse from bus 11, and a counter 32 is reset to its zero count value. The counter 32 then immediately starts its counting up operation in a duration T between two successive pulses (refer to FIG. 5A). A comparator 33 compares the count value of the counter 32 with a value previously set in a register 34. When the count value of the counter is larger than the preset value of the register, the comparator 33 resets the flag 31. The previously set value of the register 34 corresponds to the execution time of the steps 21 and 22. With such an arrangement, when the application program is in the key input wait mode, since the counter 32 is often reset, the flag 31 is not reset and maintains its set state so that a key input wait signal 35 as the output of the flag 31 is kept active. In the data processing mode, on the other hand, the counter 32 performs its counting up operation and satisfies a relationship B<A before receiving its reset input. Accordingly, the flag 31 is reset by the comparator 33 so that the key input wait signal 35 is made inactive.

Referring to FIG. 4A, there is shown an exemplary arrangement of the controller 2 in FIG. 1. In the drawing, a counter 41 receives the key input wait signal 35 from the key input wait discriminator 1. When the key input wait signal 35 is inactive, i.e., at its low level, the counter 41 is reset to its zero count value. When the key input wait signal 35 is active, the counter 41 sequentially counts as shown in FIG. 5C. A comparator 42 compares the count value of the counter 41 with a value previously set in a register 43. When the count value of the counter 41 becomes larger than the previously set value of the register (D<C), the comparator 42 outputs a high-level clock change-over signal 44, as shown in FIG. 5D, to the switch 4 in FIG. 1. The switch 4, when receiving the change-over signal 44 from the comparator 42, supplies the low frequency clock signal 6 to the CPU 7. Since the present embodiment is designed so that, when a relationship D<C is satisfied or when the counter 41 counts to its maximum count value, the counter 41 stops its counting operation and holds its maximum count value, the output 44 of the comparator 42 in FIG. 5D maintains its high level. The set value of the register 43 corresponds to the time period from the beginning of the key input wait mode to the lowering operation of the clock frequency. The presence of a key input causes no arrival of the pulse of FIG. 5A and the relationship A=B or B<A is satisfied as mentioned above, whereby the key input wait signal 35 becomes inactive thereafter and the count value of the counter 41 becomes zero. As a result, the count value of the counter becomes less than the set value of the register 43 so that, the comparator 42 detects the relation and issues the clock change-over signal 44 to raise the clock frequency to the original level. A value corresponding to a time duration $T_{34}$ somewhat longer than the time T in FIG. 5A is set in the register 34 so that such resetting operation as shown in FIGS. 5B, 5C and 5D is carried out.

FIG. 4B shows another embodiment of the clock change-over control. In the drawing, a counter 41', when receiving an input next to its maximum count value, is returned to its zero count value and then continuously performs its counting operation. The output of a comparator 42' connected to the counter 41' becomes lower than the zero count value. An output 48 of a flip-flop 50, which receives the output 35 of the flag 31 as its reset input (negative logic) and an output 46 of the comparator 42' as its set input (positive logic), keeps its high level so long as a relationship A≦B is satisfied. Therefore, the output 48 of the flip-flop 50 may be used as a frequency change-over control signal.

What is claimed is:
1. A data processing system comprising:
   a processor which calls a key sense routine to issue a flag set instruction pulse signal on a system bus when waiting for input of data;
   discrimination means for receiving said flag set instruction pulse signal from said processor and generating a first signal when said flag set instruction pulse signal is received, wherein said discrimination means includes time measuring means for measuring a first predetermined time during which said flag set instruction pulse signal is not received, and wherein said time measuring means includes first free running counter means which is reset by a pulse in said flag set instruction pulse signal, first register means having stored therein a value corresponding to said first predetermined time, first comparator means for comparing an output of said first free running counter means with an output of said first register means, and first flag means for receiving said flag set instruction pulse signal as a set input and receiving an output of said first comparator means as a reset input;

control means for generating a second signal in response to receipt of said first signal from said discrimination means; and switch means for selecting one of at least two clock signals of different frequencies to be sent to said processor in response to presence or absence of receipt of said second signal from said control means.

2. A data processing system comprising:

a processor which calls a key sensing routine to issue a flag set instruction pulse signal on a system bus when waiting for input of data;

discrimination means for receiving said flag set instruction pulse signal from said processor and generating a first signal when said flag set instruction pulse signal is issued;

control means for generating a second signal in response to receipt of said first signal from said discrimination means, wherein said control means includes second free running counter means which is reset in response to said first signal received from said discrimination means, second register means having stored therein a value corresponding to said first predetermined time, and second comparator means for comparing an output of said second free running counter means with an output of said second register means; and switch means for selecting one of at least two clock signals of different frequency to be sent to said processor in response to presence or absence of receipt of said second signal from said control means.

3. A data processing system as set forth in claim 2, wherein said control means further includes flag means which is reset by said first signal received from said discrimination means and set by an output of said second comparator means.

* * * * *